INVENTOR
Hermann Scholl
by Michael J. Striker
Atty

INVENTOR
Hermann Scholl
by
Michael S. Striker
Atty

Aug. 29, 1967 H. SCHOLL 3,338,221

ELECTRICAL CONTROL DEVICE

Filed Jan. 7, 1965 4 Sheets-Sheet 3

INVENTOR
Hermann Scholl
by
Michael J. Striker
Atty

Aug. 29, 1967 H. SCHOLL 3,338,221

ELECTRICAL CONTROL DEVICE

Filed Jan. 7, 1965 4 Sheets-Sheet 4

INVENTOR
Hermann Scholl

BY Michael J. Striker
Atty

United States Patent Office 3,338,221

Patented Aug. 29, 1967

3,338,221

ELECTRICAL CONTROL DEVICE

Hermann Scholl, Stuttgart, Germany, assignor to Robert Bosch G.m.b.H., Stuttgart, Germany Filed Jan. 7, 1965, Ser. No. 424,074

Claims priority, application Germany, Jan. 11, 1964, B 74,964

15 Claims. (Cl. 123—32)

The present invention relates to an electrical control device and more particularly to a control device for operating a fuel injection unit for internal combustion engines. The device includes an input transistor and an output transistor forming a monostable multivibrator for producing rectangular-shaped control pulses, which pulses are initiated by trigger pulses which actuate the input transistor. The duration of these control pulses is determined jointly by a timing control element provided between the input and output transistors and by a control voltage.

The problem in electronic switches of this type is to control the pulse duration of the (monostable) multivibrator, which duration corresponds to the time which the multivibrator spends in its unstable state, by means of the trigger pulse frequency. One attempt at solving this problem involved utilizing an integrating circuit to derive a control voltage from the trigger pulse sequence. The amplitude of the control voltage then depends upon the trigger pulse frequency. This control voltage is applied to a suitable monostable multivibrator, the pulse duration of which is a function of the control voltage. These attempted solutions have, however, the disadvantage that a unique relationship between the pulse duration and the trigger pulse frequency is achievable only if these two variables are related by a monotonic function.

It is an object of the present invention to provide an electronic switch in which the above-mentioned limitations do not have to be taken into account.

In order to achieve this object as well as others, the present invention provides a control system in which the multivibrator control voltage is a variable function of time which may be non-monotonic, increasing and decreasing in a given period; this time dependency repeats itself periodically with the same frequency as the control pulses. The beginning of each period of the control voltage has a constant phase displacement with respect to the trigger pulse and with respect to the switching pulse. According to a feature of the invention, a switching arrangement is provided for producing this control voltage which includes several series-connected switches, preferably switching transistors, which produce the desired control voltage at a capacitor connected in parallel with the base-emitter path of the input transistor.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
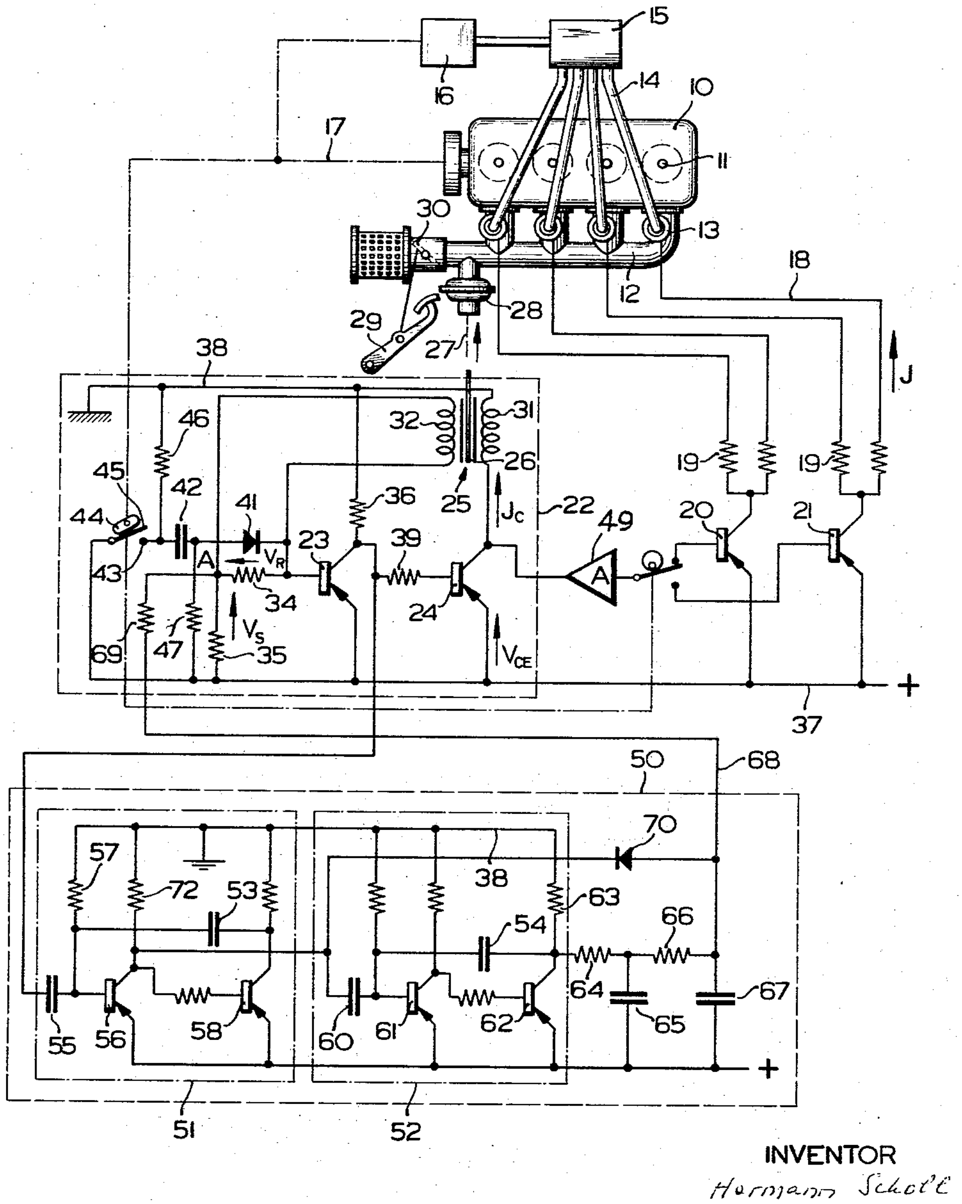
FIGURE 1 is a schematic circuit diagram of a control unit for a fuel injection system, which unit includes a monostable multivibrator for producing the control pulses, and a switching circuit for producing the control voltage for the multivibrator.

Referring now to the figures, the fuel injection system shown in FIGURE 1 is designed for a four-cylinder internal combustion engine 10, the spark plugs 11 of which may be connected to a conventional high-voltage ignition system. In the immediate vicinity of each intake valve of the internal combustion engine, an electromagnetically actuatable injection valve 13 is provided; these injection valves are seated on the branch feed pipes of the intake manifold 12 leading to the individual cylinders. Fuel is fed to each valve 13 from a distributor 15 via one of the fuel lines 14. The fuel is maintained, in the distributor and in the lines 14, under an approximately constant pressure of about 2 atmospheres over atmospheric pressure, by a pump 16 which is coupled with the crankshaft 17 of the engine.

Each of the injection valves 13 contains an actuating winding (not shown) connected between ground and, via connections 18, one of four resistors 19. Two of the resistors 19 are connected together to the collector of each of the two power transistors 20 and 21. These power transistors are part of an electronic regulating and control device, which is described in more detail below.

The regulating and control device illustrated contains, in addition to power transistors 20 and 21, a monostable transistor-multivibrator 22 for producing electrical control pulses; the multivibrator includes an input transistor 23 and an output transistor 24, as well as an iron-cored choke coil 25, which is the timing control element.

The iron-cored choke coil 25 is fashioned as a transformer and is provided with an adjustable armature 26, mounted on a slide rod 27 which is connected with the diaphragm of a vacuum chamber 28. The suction side of the vacuum chamber is connected to the intake manifold 12 of the internal combustion engine immediately behind the throttle valve 30, which is operable by a foot pedal 29. As manifold vacuum increases, the vacuum chamber diaphragm lifts the armature 26 upward (in the direction designated by the arrow), increasing the air gap in the iron core. This increase in manifold vacuum thus reduces the inductance of the primary winding 31 of the transformer.

The secondary winding 32 of the iron-cored choke 25 is connected in parallel with resistor 34 between the base of the input transistor 23 and junction point A. A resistor 35 is connected between point A and the positive line 37, connected to the positive pole of a power supply which may conveniently be a 12-volt battery. The emitter of transistors 23 and 24, which are both of the pnp-type, are directly connected to the positive line 37. The collector of the input transistor 23 is connected via resistor 36 to ground line 38, and the collector of transistor 24 is connected with ground line 38 via the primary winding 31 of the iron-cored transformer 25. The base of transistor 24 is connected with the collector of input transistor 23 via a coupling resistor 39. A control line connects the base of transistor 23 via a diode 41 and a capacitor 42 to the fixed contact 43 of a switch, the breaker arm 45 of which is connected to the positive line 37. This breaker arm is closed once with each revolution of the crankshaft by means of a two-lobed cam 44 coupled with the crankshaft 17 of the engine via the camshaft. During this closing period, transistor 23 is set to its blocked state. One plate of capacitor 42 is connected to ground line 38 via a resistor 46, while the other plate is connected with the positive line 37 via a resistor 47.

Before going into the details of other switching elements in the regulator a description of how control pulses J are produced will be presented. These pulses occur at each closing of switching contacts 43, 45, and determine the duration of opening of the injection valves 13. The length of control pulses J is a function of the vacuum in the intake manifold 12 and the inductance of the primary winding 31.

Figure 2:
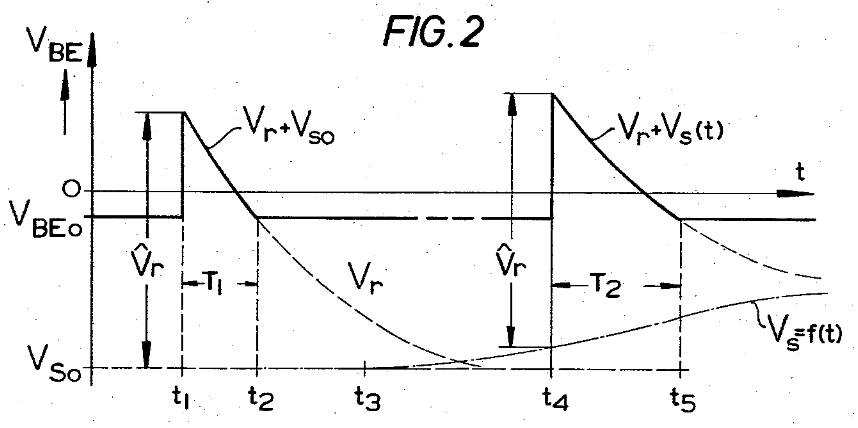
FIGURE 2 is a plot illustrating the mode of operation of the multivibrator and the switching circuit.

Immediately before each instant of closure of the breaker arm 45, the input transistor 23 is conductive, thus holding the output transistor 24 in its blocked condition. As soon as the switch 43, 45 is closed by cam 44, the charge stored in capacitor 42 raises the base potential of the input transistor 23 above the potential of the positive line 37. Transistor 23 is thus blocked switching multivibrator 22 into its unstable state, in which the transistor 24 becomes conductive. Transistor 24 is then capable of conducting a collector current $J_c$, which rises exponentially. This collector current flows through the primary winding 31 and produces a similar exponentially increasing magnetic field in the iron core (not shown) and in the armature 26 of the transformer. The rate of increase of pulse $J_c$ increases with increasing air gap, since this decreases the inductance of the primary winding 31. This increase in current induces a voltage $V_r$ in the secondary winding 32, which is represented in FIGURE 2. This voltage decreases exponentially from its maximum value $\hat{V}_r$, occurring at the instant of closure $t_1$ of the switching contacts 43, 45, at a rate determined by the magnitude of the inductance. The voltage $V_r$ is superposed on the bias voltage $V_s$ across resistor 35 between point A and the positive line 37. If, at the instant $t_2$, the sum of these voltages reaches the value $V_{BE_0}$ of about 0.3 volt, the input transistor 23 (which has been kept in its blocked condition by the voltage $V_r$) again becomes conductive.

As long as the transistor 23 is blocked, conductive transistor 24 maintains the power transistors 20 and 21, respectively, which are connected via an amplifier 49, in their conductive states. However, as soon as transistor 23 returns to its stable, conductive operating condition, the transistors 24, 20, 21 are blocked again. The duration of the pulses J which cause the valves 13 to open thus extends from the instant of closure $t_1$ of the breaker arm 45 to the instant $t_2$. When the inductance of the primary winding 31 decreases, with increasing vacuum in the intake manifold 12, allowing the collector current $J_c$ to increase faster, the voltage $V_r$ likewise decays faster, returning the input transistor 23 to its conductive condition more rapidly. Thus under increased vacuum, the valves 13 are closed substantially earlier than where a large inductance and small vacuum are present.

By means of the above-mentioned variation of the inductance of the primary winding 31, the duration of the control pulses J of the injection valves are thus adjusted to the instantaneous ambient vacuum of the internal combustion engine. However, tests carried out both while actually driving and on the test stand have shown that the quantity of fuel which must be injected into each cylinder should, in addition, be dependent on the speed of the engine, although the latter dependency is not as strong as the former. In order to change the control pulse duration as a function of engine speed, the regulating and control unit of FIGURE 1 also includes a switching device 50 by means of which the bias voltage $V_S$, which has heretofore been assumed constant (left-hand portion of FIGURE 2), is varied periodically; the frequency corresponding to this period is equal to the frequency of the injection control pulses. By this means the pulse lengths are related to the speed of the engine, via which is applied the trigger frequency to the multivibrator 22 by cam 44.

The switching device 50 produces the control voltage $V_S$, which repeats periodically. During each period the voltage is not monotonic; it both increases and decreases, or stated another way, it has both positive and negative time derivatives. The switching device includes two monostable multivibrators 51 and 52. Each of the latter, unlike multivibrator 22, has a period determined by a capacitor 53, 54. Multivibrator 51, at the input of switching device 50, is connected with the collector of input transistor 23 via a coupling condenser 55; this multivibrator is not triggered into its unstable position until the input transistor 23, at the end of an injection pulse, returns to its conductive state. Up to the time immediately before this instant, the input transistor 56 of the multivibrator 51 is in its conductive condition, as its base is connected via a resistor 57 with the ground line 38 (which is common to the switching device 50 and to multivibrator 22). Transistor 58 is always in an operating condition opposite to that of transistor 56, and thus is blocked as long as transistor 56 is in its stable, conductive condition. For the duration of this condition, the capacitor 53, which serves as the timing element, can charge up to approximately the ambient operating voltage between ground line 38 and the common positive line 37.

As soon as the input transistor 23 of multivibrator 22 returns to its conductive condition, blocking one of the power transistors 20 and 21 and simultaneously closing the injection valves 13, its collector potential almost reaches the potential of positive line 37, and the charged coupling condenser 55 raises the base potential of the transistor 56 positive beyond the potential of positive line 37. This blocks transistor 56, and transistor 58 simultaneously becomes conductive. This blocked condition remains, since the base transistor 58 is held positive by the voltage across capacitor 53, until the latter has discharged, through resistor 57. Thereafter, transistor 56 returns to its stable, conductive operating condition. Only at this instant is the third multivibrator 52 actuated, via its coupling condenser 60. During the above-described return flip of multivibrator 51, the input transistor 61 of multivibrator 52 receives a positive blocking pulse via the coupling condenser 60, which thus renders the output transistor 62 of multivibrator 52 conductive. Consequently, the collector potential of this output transistor is raised to within about 0.5 volt of the potential of positive line 37. However, to the collector of this output transistor a capacitor 65 is connected via a resistor 64, and a capacitor 67 is connected via a further resistor 66; furthermore, a line 68 is connected from the junction of resistor 66 and capacitor 67, through resistor 69 to junction point A.

Figures 3, 4, 5:
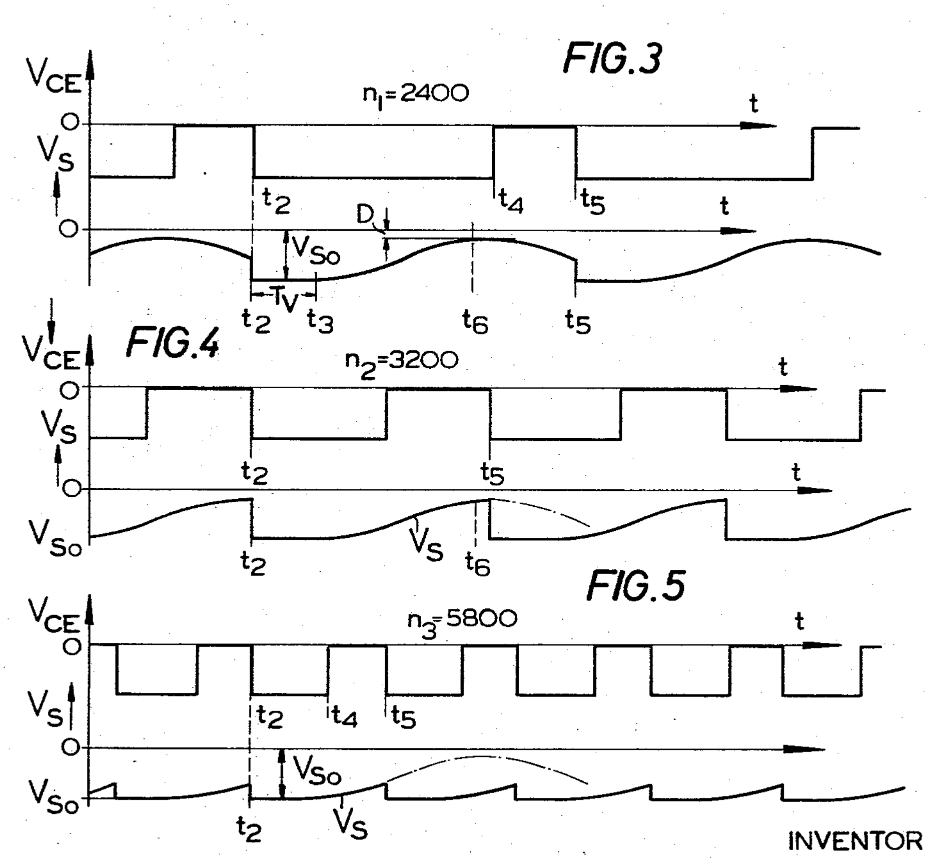
FIGURES 3 through 5 show graphs illustrating the mode of operation of the multivibrator and the switching circuit at various speeds of the internal combustion engine which is being controlled.

Up to immediately before the instant of actuation of multivibrator 52, described above, the output transistor 62 is in its blocked condition. In this condition, the two capacitors 65 and 67 are charged, via collector resistor 63 of the output transistor 62, to a voltage which determines the voltage $V_{S0}$ across resistor 35 of multivibrator 22. At the instant indicated by $t_3$ in FIGURE 2, the output transistor 62 becomes conductive, discharging capacitors 65 and 67. The control voltage $V_S$ varies during this discharge process according to the curve $V_S=f(t)$, shown as a dot-dashed line. Thus, when the inductive feedback voltage $V_r$ is generated by the next closing of breaker arm 45, at $t_4$, the opposing bias voltage $V_S$ has a smaller absolute value than before, which continues to decrease after $t_4$. Therefore, the sum of these two voltages $$V_r+V_S(t)$$

which is the base-emitter voltage at transistor 23, decreases more slowly than in the case illustrated in the left-hand portion of FIGURE 3, for which the assumption was made that the voltage $V_S$ is a constant $V_{S0}$. Thus the change of voltage $V_S(t)$ causes a lengthening of the control current pulses J to the substantially larger pulse duration $T_2$, because the emitter-base voltage $V_{BE_0}$ required to return the input transistor 23 to its stable, conductive condition is reached after a longer interval at $t_5$, as is clearly seen from FIGURE 2.

In FIGURES 3 through 5, the curve of rectangular wave $V_{CE}$ (the emitter-collector voltage of output transistor 24) is shown along with control voltage $V_S$. The control voltage has a time dependency, or period, which repeats itself with the frequency of the switching pulse period. The same cutoff point $t_2$ for the first multivibrator is used as basis in all of FIGURES 3 through 5, so that the influence of the respective number of revolutions per minute $n$ of the internal combustion engine upon the pulse duration $T_2$ may be seen more clearly. In FIGURE 3, a number of revolutions $n_1$=2400 r.p.m., giving a switching frequency of the breaker arm 45 of $f_1$=40 cycles, is assumed. The unit of time for the time axis $t$ is, however, chosen to be smaller than in FIGURE 2. FIGURES 4 and 5 both show (with the same time unit as FIGURE 3) the voltage $V_{CE}$ and control voltage $V_S$; FIGURE 4, however, is plotted for a number of revolutions $n_2$=3,200 r.p.m., and FIGURE 5 for $n_3$=5,800 r.p.m. From FIGURE 3 it can be clearly seen that, beginning with the starting time $t_2$, the control voltage $V_S$ first maintains the constant value $V_{S_0}$ for a delay time $T_v$, which is determined by multivibrator 51 and which lasts until the instant $t_3$. Starting at $t_3$, when the output transistor 62 of the third multivibrator 52 becomes conductive, the magnitude of control voltage $V_s$ first continuously decreases, as a consequence of the discharge of capacitors 65 and 67, approaching its minimum value, indicated by the distance D. This minimum value is reached when, at the instant $t_6$, the output transistor 62 returns to its blocked condition after a time determined by capacitor 54 has expired, terminating the discharge of capacitors 65 and 67 and causing them to begin charging up again.

This charging process, however, is terminated suddenly at instant $t_5$ because at this instant, in accordance with the explanation given above in connection with FIGURE 2, the input transistor 23 becomes conductive again at the end of the switching pulses, and the output transistor 24 becomes blocked. Simultaneously, the transistor 56 of multivibrator 51 enters its blocked state, as described previously with respect to instant $t_2$. This change in the operating condition of transistor 56 is utilized to obtain an accurately defined charge condition at capacitor 67, independently of the residual charge present at instant $t_5$. For this purpose, a rectifier 70 is provided in line 68 leading to the collector of transistor 56, which is conductive in the direction toward the collector. Furthermore, the collector resistor 72 leading from the collector of transistor 56 to the negative line 38 has a resistance value which is substantially lower than the values of resistors 63, 64, 66, 69, 35. If, thus, the transistor 56 assumes its unstable, non-conductive operating condition at the switching-off instant $t_5$, the rectifier 70 provides a low-resistance connection between the negatively charged plate of the capacitor 67 and ground line 38. The capacitor 67 can therefore be charged in an exceedingly short time to a constant initial value, which returns resistor 35 to its initial value of control voltage $V_S$, designated as $V_{S_0}$ in FIGURES 2 through 5. In this manner, it is assumed that control voltage $V_{S_0}$ always has the same starting value, independent of the number of revolutions $n$ of the engine.

In the graph of FIGURE 4, the closing instant $t_5$ of the injection valves is almost identical with instant $t_6$, at which the control voltage $V_S$ reaches its minimum; this is so because of the higher switching frequency. In FIGURE 5, in contradistinction, at a speed of $n_3$=5,800 r.p.m., the opening instant $t_4$ of the injection valves follows the previous closing instant $t_2$ so closely that the control voltage $V_S$ can change only insignificantly from its initial value $V_{S_0}$ until instant $t_5$ is reached, at which the injection process is finished again.

Figure 6:
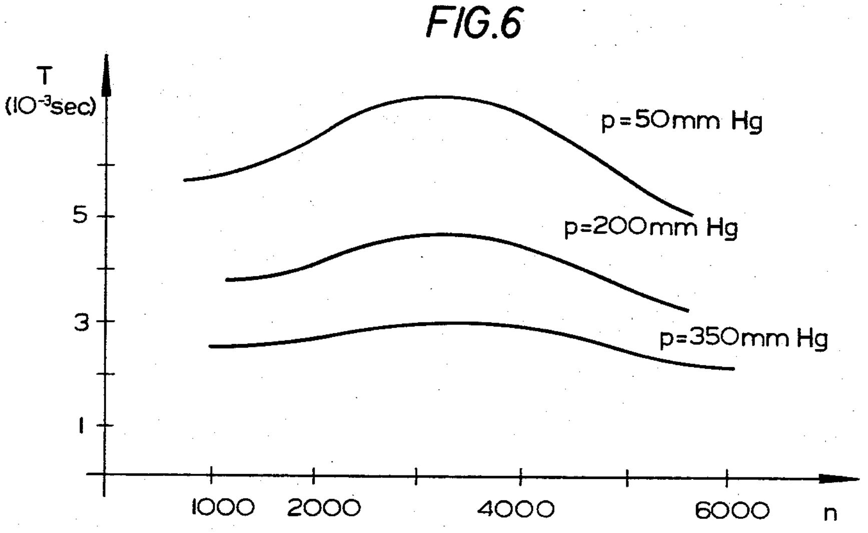
FIGURE 6 shows a graph of a family of characteristic curves relating the quantity of fuel admitted to a given cylinder to the time during which the pertinent valve is open.

The graph of FIGURE 6 shows clearly how the duration T of the control current pules J varies as a function of the number of revolutions $n$, under the influence of the control voltage $V_S$. The assumption is made that for each curve the vacuum $p$ in the intake manifold 12 is a constant (and thus the inductance of the primary winding 31 does not vary).

The maxima of the curves lie at about 3,600 r.p.m. and show an increase in value at this point by about 20% over those values which the engine requires at 1,000 r.p.m. In the high-power engine for which this group of curves is drawn, the oscillation of the intake air column, generated by the closing and opening of the intake valves, is utilized, by adjusting the length of the individual intake paths, to increase the degree of admission of the fuel into the individual cylinders. As the adjustment is based on a resonance effect and thus always exhibits the greatest efficiency at the same r.p.m. the maxima for the respective vacuum values must not vary with the number of revolutions. This is achieved in the embodiment described by actuating the control device not at the beginning of the opening current pulses, which occur at instant $t_1$ or $t_4$, but in each case at the ends of the opening current pulses, which lie at $t_2$ and $t_5$, respectively. If, therefore, at a constant number of revolutions, the vacuum and thus the inductance of the primary winding 31 are changed by opening or closing the throttle valve, this does not have any influence on the phase position of the control voltage $V_S$ with respect to the opening current pulses, and the maxima of the characteristic curves remain independent of the vacuum.

Figure 7:
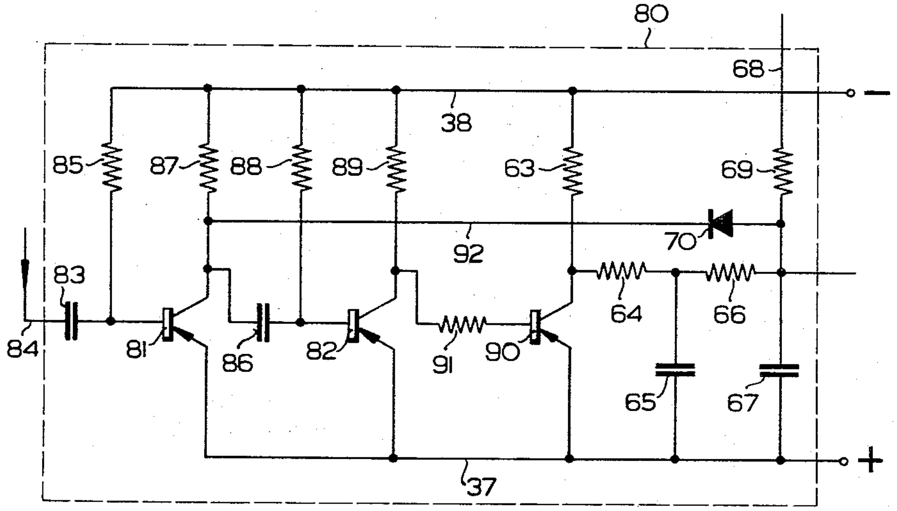
FIGURES 7 and 8 are schematics illustrating two simpler switching units designed according to the present invention.

FIGURE 7 illustrates a modified embodiment of a switching device 80 which can be connected in place of the switching device 50 with multivibrator 22, as shown in FIGURE 1. This embodiment differs from that previously described in that the two multivibrators 51 and 52 are replaced by switching transistors 81 and 82, respectively, operating with delay between them. The base of switching transistor 81 is connected via a capacitor 83 and line 84 to the collector of the input transistor 23 of the multivibrator 22. This capacitor 83 takes over the task of the coupling condenser 55, as well as the capacitor 53 of the second multivibrator 51 of FIGURE 1; the latter capacitor acted as the timing element. Capacitor 83 is chosen to be so large that from the instant ($t_2$, $t_5$) when transistor 81 is set to its unstable state it can discharge (via resistor 85) sufficiently to return the transistor to its stable, conductive state only after a delay time $T_V$, indicated in FIGURE 3. As this transistor 81 is blocked while capacitor 83 is discharging, the capacitor 86 provided between the collector of transistor 81 and the base of transistor 82 can be charged to operating voltage (12 volts in this case). As soon as transistor 81, the collector of which is connected through a low resistance 87 to the ground (negative) line 38, has returned to its conductive condition, the charge stored in capacitor 86 raises the potential of transistor 82 beyond the potential of positive line 37, blocking transistor 82 until capacitor 86 has discharged through resistor 88. Then transistor 82, the collector resistor 89 of which is connected to ground line 38, can return again to its blocked condition.

However, capacitors 65 and 67 (analogous to capacitors 65 and 67 in FIGURE 1) have to be discharged immediately after the delay time $T_V$ caused by the delay capacitor 83 of transistor 81, and while transistor 82 is in its unstable blocked condition, and they must be charged again starting with the return of transistor 82 to its stable, conductive state, in order to obtain the curve of control voltage $V_S$ derived from capacitor 67 which is shown in FIGURES 2 through 5. Therefore, it is necessary to provide an inverting transistor 90 between transistor 82 and resistor 64; this inverting transistor is always in an operating condition opposite to that of transistor 82. Its base is connected to the collector of transistor 82 via a resistor 91, while the collector of the inverting transistor is connected through resistor 63 to the ground line 38.

As in the case of the above-described switching device 50, a rectifier 70 connected between the collector of transistor 81 and capacitor 67 via a line 92 is also provided, ensuring a definite initial charge on capacitor 67 at instants $t_2$ and $t_5$, respectively, when the discharge process starts.

Figure 8:
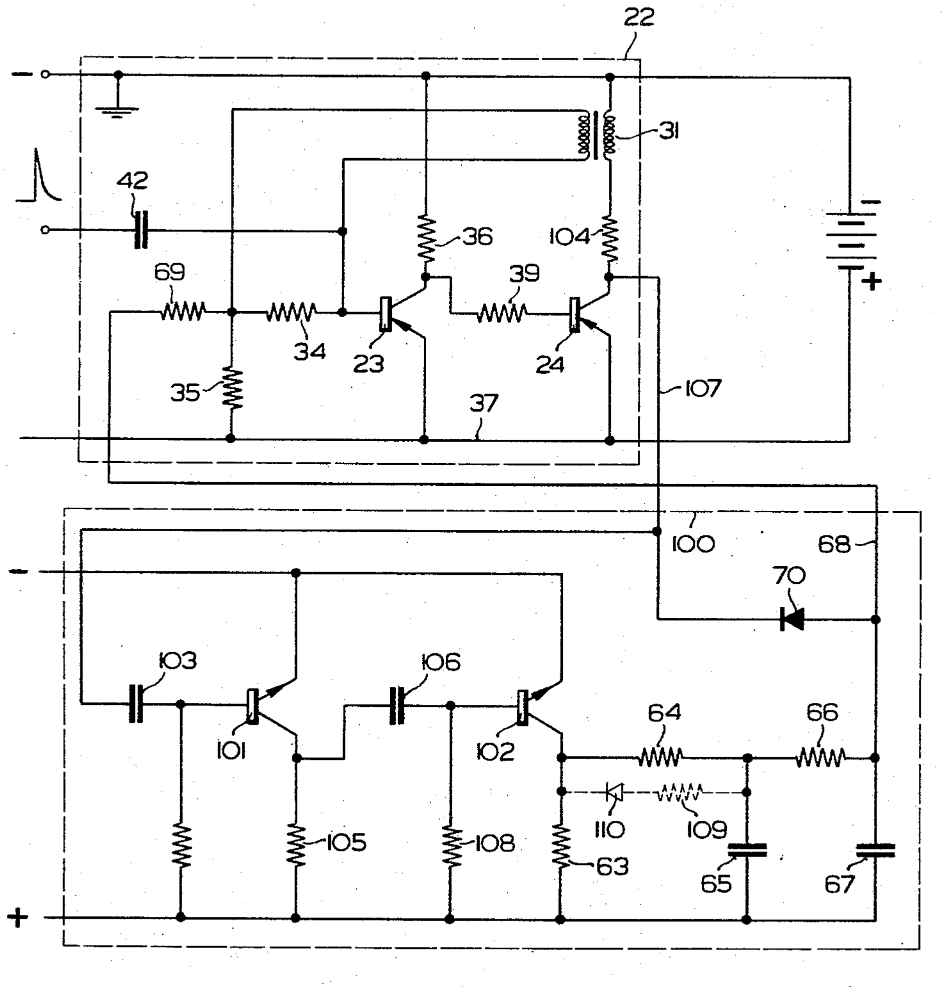

In addition to saving a transistor in comparison to the control device of FIGURE 1, as is achieved in the control apparatus 80 of FIGURE 7, a further simplification can be accomplished if, according to FIGURE 8, a control device 100 is provided which is equipped with only two transistors 101 and 102. As these transistors are of the npn-type, in contradistinction to transistors 56, 58, 61, 62 of control device 50 and transistors 81, 82, and 90 of control device 80, an inverting transistor is not required. In this case, however, it is necessary to connect the base of the first transistor 101, which provides a constant delay time $T_V$ until the onset of the discharge of capacitors 65 and 67, to the collector of output transistor 24 via a sufficiently large delay capacitor 103, instead of connecting the base of transistor 101 to the collector of the input transistor of multivibrator 22. This capacitor 103 can then charge, as soon as output transistor 24 returns to its stable, blocked condition, through the primary winding 31 and a resistor 104 connected in series with the winding. During this charging process transistor 101 is thus blocked. Simultaneously capacitor 106 connected between the base of transistor 102 and the collector of transistor 101, is charged through collector resistor 105 of transistor 101. At the instant $t_3$, when capacitor 103 is fully charged and transistor 101, at the end of delay time $T_V$, returns to its stable conductive state, the previously conductive transistor 102 is blocked. Starting at this time, the two capacitors 65 and 67 can be discharged through resistors 64 and 66, as well as through resistor 63 provided between the collector of transistor 102 and the positive line 37. When, at time $t_6$ shown in FIGURES 3 and 4, the capacitor 106 has been discharged via resistor 108, the second transistor 102 automatically returns to its original conductive state. At this time, capacitors 65 and 67, which now have only a small amount of charge, can be charged anew via resistors 35 and 69. In order to ensure a definite starting voltage on capacitor 67 at the beginning of the following period of the control voltage $V_S$, the rectifier 70 is connected to the line 107 leading from capacitor 103 to the collector of output transistor 24. As output transistor 24 returns to its blocked condition, at the end of each control pulse J ($t_2$ and $t_5$), capacitor 67 can charge within an exceedingly short time to the operating voltage through rectifier 70, low resistance 104, and the primary winding 31, thus determining the initial value $V_{So}$, which is always the same and which is important for the start of the control voltage ($V_S$) cycle.

If an engine is used which is different from that on which the family of curves shown in FIGURE 6 is based, it may be necessary to assure that capacitors 65 and 67 have a discharge time constant which is smaller or larger than their charging time constant and that the control voltage $V_S$ is a non-symmetrical function of time with respect to its minimum, which lies at $t_6$. This can be achieved in a simple manner if, as indicated in FIGURE 8 by means of broken lines, a series connected resistor 109 and rectifier 110 are provided in parallel with resistor 64, or. alternatively, in parallel with resistor 66. If rectifier 110 is conductive in the direction of current indicated the charging time is shortened; if the conductive direction is opposite to that shown, the discharge time is shortened. In place of such a parallel connection, one or several additional resistors may be connected in series, bridged by respectively one rectifier, with one of the resistors 64, 66.

It will be understood that each of the elements described above, or two or more together, may also find a useful application in other types of control devices differing from the types described above.

While the invention has been illustrated and described as embodied in a particular engine, it is not intended to be limited to the details shown, since various modifications and structural changes may be made without departing in any way from the spirit of the present invention.

Without further analysis, the foregoing will so full reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalents of the following claims.

What is claimed as new and desired to be secured by Letters Patent is:

1. In a control device for operating a fuel injection unit for internal combustion engines, said device including means for generating trigger pulses in synchronism with the engine speed, a monostable multivibrator having an input responsive to said trigger pulses and adapted to switch said monostable multivibrator to the unstable state, an output adapted to furnish a control pulse while said multivibrator is in said unstable state, said control pulse having a trailing edge, feedback means connecting said multivibrator output to said multivibrator input, responsive to said control pulse and adapted to maintain said multivibrator in the unstable condition as a function also of the manifold pressure, and wherein said control pulse is adapted to cause the opening of electromagnetic valves in said fuel injection unit for a period of time corresponding to the duration of said control pulse: a system for supplying a time varying control voltage to said input of said monostable multivibrator in such a manner that the time duration of the control pulse, and therefore the period of time the input valves of said fuel injection system are open, will vary as a function of the engine speed as well as manifold pressure, comprising, in combination, storage means adapted to generate a control voltage as a function of the energy stored therein; timing means responsive to the trailing edge of said control pulse, adapted to provide a discharge path for said storage means for a predetermined time period following said trailing edge of said control pulse, and further adapted to provide a relatively long time constant charge path for said storage means from the end of said predetermined time period to the occurrence of the next trailing edge of said control pulse; charging means responsive to the trailing edge of said control pulse, adapted to charge said storage means substantially instantaneously, thus assuring that the control voltage generated by said storage means is the same at the beginning of each discharge cycle; and coupling means adapted to couple the control voltage generated by said storage means to the input of said monostable multivibrator in such a manner as to vary the width of the control pulse in dependence thereto.

2. A system as set forth in claim 1, also comprising time delay means responsive to said trailing edge of said control pulse, adapted to generate a delayed timing signal after a second predetermined time period following the occurrence of said trailing edge of said control pulse; and coupling means adapted to couple said delayed timing signal to the input of said timing means.

3. A system as set forth in claim 1, wherein said storage means comprise capacitive storage means.

4. A system as set forth in claim 1, wherein said timing means comprise switching means having a stable conductive and an unstable non-conductive state, and adapted to be switched to said non-conductive state by said trailing edge of said control pulse; delay means responsive to said trailing edge of said control pulse, and adapted to delay the return of said switching means to the conductive state for said predetermined time period; and a charge and a discharge circuit connected to said storage means when said switching means are in non-conductive and conductive state respectively.

5. A system as set forth in claim 2, wherein said time delay means comprise additional switching means having a stable conductive and an unstable non-conductive state, adapted to be switched to said non-conductive state by said trailing edge of said control pulse, adapted to generate said delayed timing signal by returning to said conductive state; and fixed time constant means responsive to said trailing edge of said control pulse, adapted to keep said additional switching means in said non-conducting state for said second predetermined time period.

6. A system as set forth in claim 2, wherein said charging means comprise undirectional coupling means connected between said storage means and a circuit point offering a low impedance charging path at the end of said control pulse, with such polarity as to permit said charging to occur.

7. A circuit as set forth in claim 4, wherein said switching means comprise a first transistor and said delay means comprise a first resistor-capacitor network.

8. A circuit as set forth in claim 5, wherein said additional switching means comprise a second transistor and said fixed time constant means comprise a second resistor-capacitor network.

9. A circuit as set forth in claim 8, also comprising a third transistor, connected to said second transistor to form a second monostable multivibrator, said second monostable multivibrator having a time constant determined by said second resistor-capacitor network.

10. A system as set forth in claim 7, also comprising a fourth transistor connected to said first transistor in such a manner as to form a third monostable multivibrator, and further connected in such a manner as to provide a discharge path for that storage means when in the conductive state; and wherein said fourth transistor is adapted to be switched into said conducting state by said trailing edge of said control pulse and is further adapted to return to the non-conducting state after a time period depending upon said first resistor-condenser network.

11. A system as set forth in claim 9, wherein the collector of said second transistor is connected to ground potential by means of a low impedance.

12. A system as set forth in claim 4, wherein said switching means comprise an NPN transistor; and said delay means comprise a resistor and a capacitor.

13. A system as set forth in claim 5, wherein said additional switching means comprise a second NPN transistor; and said fixed time constant means comprise a second resistor and capacitor.

14. A system as set forth in claim 13, wherein said unidirectional conduction means is connected between the collector of the output transistor of said monostable multivibrator and one terminal of said storage means.

15. A system as set forth in claim 14, also comprising directive impedance means connected between said storage means and said second transistor in such a manner as to establish one time constant for the charging time of said storage means and a second time constant for the discharge time of said storage means.

References Cited

UNITED STATES PATENTS

| | | | |
|---|---|---|---|
| 2,992,640 | 7/1961 | Knapp | 123—32 |
| 3,005,447 | 10/1961 | Baumann et al. | 123—32 |
| 3,020,897 | 2/1962 | Sekine et al. | 123—32 |
| 3,051,152 | 8/1962 | Paule et al. | 123—119 |
| 3,240,191 | 3/1966 | Wallis | 123—132 |

LAURENCE M. GOODRIDGE, *Primary Examiner.*